United States Patent [19]

Fetzer et al.

[11] Patent Number: 5,612,009

[45] Date of Patent: *Mar. 18, 1997

[54] CATALYTIC DECOMPOSITION OF DINITROGEN MONOXIDE

[75] Inventors: Thomas Fetzer; Wolfgang Buechele, both of Ludwigshafen; Hermann Wistuba, Mannheim; Claus Witte, Bad Durkheim; Gert Buerger, Mannheim; Guenter Herrmann, Heidelberg, all of Germany

[73] Assignee: BASF Aktiengesellschaft, Ludwigshafen, Germany

[*] Notice: The term of this patent shall not extend beyond the expiration date of Pat. No. 5,300,269.

[21] Appl. No.: 199,191

[22] PCT Filed: Aug. 20, 1992

[86] PCT No.: PCT/EP92/01900

§ 371 Date: Feb. 28, 1994

§ 102(e) Date: Feb. 28, 1994

[87] PCT Pub. No.: WO93/04774

PCT Pub. Date: Mar. 18, 1993

[30] Foreign Application Priority Data

Aug. 29, 1991 [DE] Germany ............... 41 28 629.4

[51] Int. Cl.$^6$ ........................................ B01J 8/00
[52] U.S. Cl. ............................................ 423/239.1
[58] Field of Search ...................... 423/239.1; 502/347

[56] References Cited

U.S. PATENT DOCUMENTS

| | | | |
|---|---|---|---|
| 3,118,727 | 1/1964 | Cohn | 23/2 |
| 4,314,913 | 2/1982 | Derrien et al. | 252/464 |
| 4,529,718 | 7/1985 | Dupin | 502/439 |
| 4,605,546 | 8/1986 | Voirin | 423/576 |
| 4,689,316 | 8/1987 | Bowman | 502/243 |
| 5,300,269 | 4/1994 | Aichinger et al. | 423/239 |

FOREIGN PATENT DOCUMENTS

| | | |
|---|---|---|
| 3543640 | 6/1987 | Germany . |
| 55-31463 | 3/1980 | Japan . |
| 61-45487 | 3/1986 | Japan . |
| 61-50650 | 3/1986 | Japan . |
| 61-53142 | 3/1986 | Japan . |
| 61-257940 | 11/1986 | Japan . |
| 63-07826 | 1/1988 | Japan . |
| 1011238 | 4/1983 | U.S.S.R. . |

OTHER PUBLICATIONS

Hayes, "The metal–catalyzed decomposition . . . ", *Can. J. Chem.*, vol. 37, 1959, pp. 583–589.

Larsson, "On the catalytic decomposition . . . ", *Catalysis Today*, vol. 4, 1989, pp. 235–251.

Banchero, "Apparatus, plant equipment, and unit . . . ", *Chem. Abst.* vol. 63, No. 16, 1965.

Lewis, Hawley's Condensed Chemical Dictionary, 10th ed. 1981 (no month) p. 777.

Translation of '940 patent publication.

*Primary Examiner*—Steven Bos
*Assistant Examiner*—Thomas G. Dunn, Jr.
*Attorney, Agent, or Firm*—Keil & Weinkauf

[57] ABSTRACT

A supported silver-containing catalyst for the decomposition of dinitrogen monoxide as pure gas or in admixture with other gases and having an aluminum oxide support which has a specific surface area of from 26 to 350 m$^2$/g, and a process for the selective catalytic decomposition of dinitrogen monoxide as pure gas or in admixture with other gases at elevated temperature, in which the said supported catalyst is used.

14 Claims, 2 Drawing Sheets

CATALYTIC DECOMPOSITION OF DINITROGEN MONOXIDE

The invention relates to a supported silver-containing catalyst and to a process for the selective catalytic decomposition of dinitrogen monoxide in pure form or in admixture with other gases, using said supported silver catalyst.

The catalytic decomposition of dinitrogen monoxide (nitrous oxide, ie, laughing gas) has been known for many years and is described in numerous publications referring to kinetic experiments. As long ago as 1936, a paper in *Gmelins Handbuch der anorganischen Chemie, Stickstoff* 8th Edition, pp 573 et seq, describes experiments on the decomposition of dinitrogen monoxide in a quartz vessel in the presence and absence of various catalysts such as $SiO_2$, platinum foil, titanium dioxide, platinum black, $Al_2O_3$, charcoal, and thorium dioxide, at various temperatures. Kinetic tests on pure silver and on silver/gold and silver/calcium alloys are described by K. E. Hayes in *Canad. J. Chem.* 37, 583 (1959). R. Larsson presents an overview of the activating energies of nitrous oxide decompositions using oxidic catalysts, particularly mixed oxides, in *Catalysis Today* 4, 235–251 (1989).

Commercial interest in the decomposition of dinitrogen monoxide to nitrogen and oxygen was instigated by NASA, who wanted to utilize the decomposition of nitrous oxide (derived from ammonium nitrate) into its elements, in order to obtain respiratory air for astronauts from a compound which is easy to handle (*Chem. Abstracts* 6, 1481 (1965)). Catalysts described as being suitable are: platinum on various inorganic supports, rhodium on aluminum oxide, and the oxides of nickel, cobalt, and molybdenum.

Another technical field of application is the destruction of anesthetic gases present, for example, in operating theatres. A number of Japanese patents relate to this field, and the following catalyst systems have been described: activated charcoal (JP 54/11090), elements in the iron group in conjunction with rare-earth metals (JP 61/45487), platinum, palladium, rhodium, indium, and/or ruthenium (JP 55/31463), and oxides of copper and chromium on aluminum oxide (JP 61/50650). The dinitrogen monoxide is usually decomposed in a 1:1 mixture of dinitrogen monoxide and air. JP 61/53142 describes the removal of dinitrogen monoxide from off-gases by contacting the same with oxides of cobalt, copper, and manganese on γ-aluminum oxide.

DE-OS 3,543,640 discloses palladium-containing catalysts for the decomposition of dinitrogen monoxide.

JP 63/07826 describes the removal of dinitrogen monoxide from off-gases by contact with, inter alia, palladium or copper oxide on a γ-aluminum support. In the example, the $N_2O$ concentration in the gas is 26 ppm.

Finally, SU 1,011,238 describes the decomposition of dinitrogen monoxide by contact with carbides on $CaCl_2$ as support.

In all of the publications cited above, either mixtures of dinitrogen monoxide and air or mixtures of dinitrogen monoxide and oxygen are reacted. DE-OS 3,543,640 describes a method in which mixtures with 430 ppm of nitrogen oxides and 4% of water (as steam) are reacted in contact with palladium catalysts.

DE-P 40 29 061.1, which is not a prior publication, describes supported silver-containing catalysts, in which the $Al_2O_3$ used as support has a specific surface area of from 5 to 25 $m^2/g$.

SUMMARY OF THE INVENTION

It is thus an object of the invention to provide a process and a catalyst for the catalytic decomposition of dinitrogen monoxide in pure form or in admixture with other gases, by means of which dinitrogen monoxide can be decomposed to the elements nitrogen and oxygen even in the presence of higher concentrations of nitric oxides and other gases which are not oxygen or nitrogen (particularly off-gases such as are obtained in the synthesis of adipic acid by, eg, the oxidation of cyclohexanol and cyclohexanone using nitric acid). Another object of the invention is to provide means of selectively degrading dinitrogen monoxide without decomposing other nitric oxides to their elements.

Figure 1:
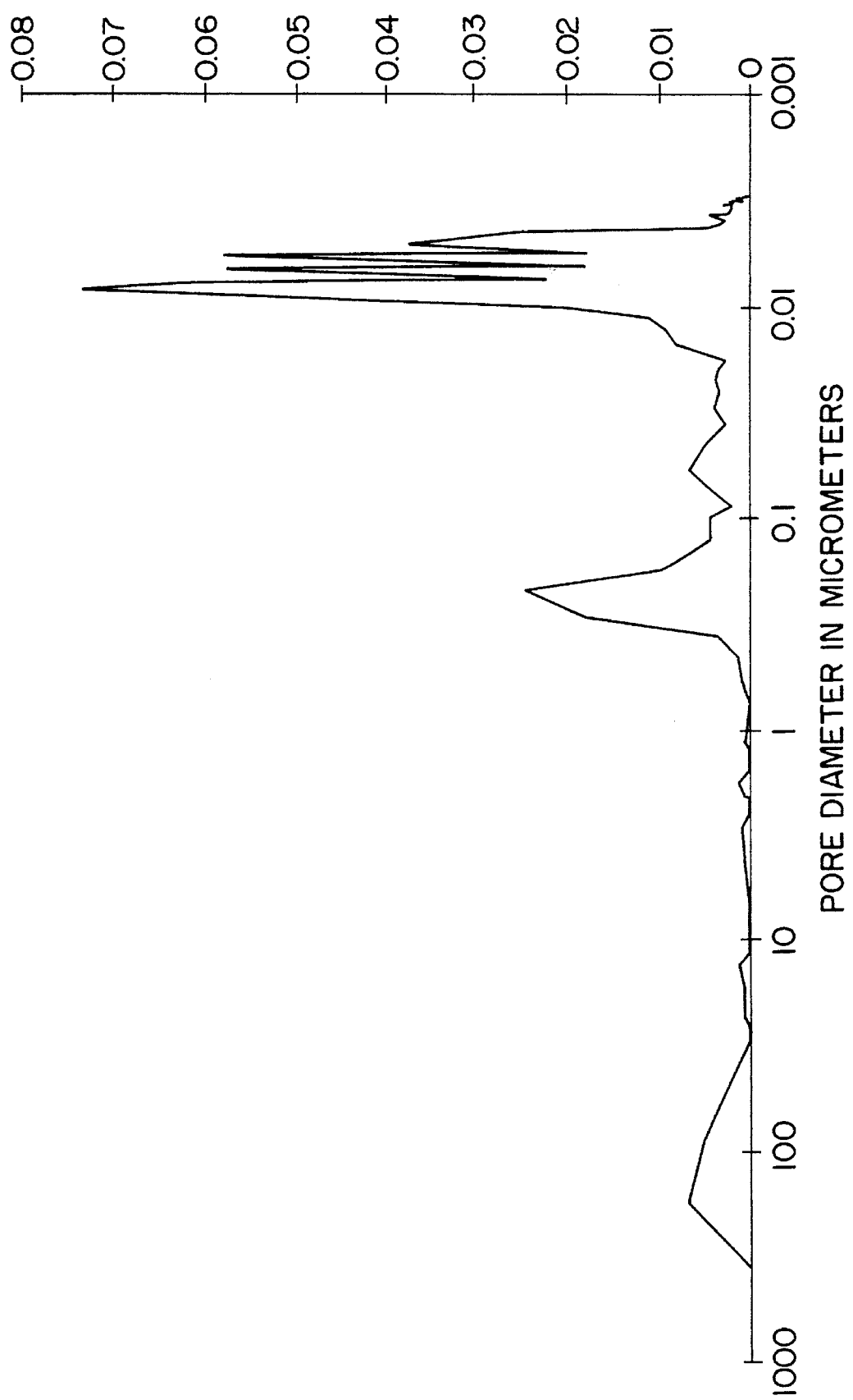
FIG. 1 and FIG. 2 show a pore distribution of a carrier used in the present invention.

We have found that the above objects can be achieved by means of supported silver-containing catalysts, in which the silver is supported on an aluminum oxide which has a specific surface area of from 26 to 350 $m^2/g$.

The present invention also relates to a process for the selective decomposition of $N_2O$ in pure form or in admixture with other gases by contacting the same with a supported silver-containing catalyst at elevated temperature, wherein the supported catalyst used is one which has an aluminum oxide support having a specific surface area of from 26 to 350 $m^2/g$.

The advantage of this process is that either very pure dinitrogen monoxide or dinitrogen monoxide in admixture with oxygen or air or in admixture with air containing larger amounts of water and/or larger amounts of nitric oxides (nitrogen monoxide, nitrogen dioxide) can be selectively decomposed to the elements nitrogen and oxygen without destroying the higher nitrogen oxides. Dinitrogen monoxide which is present in mixtures containing, eg, up to 50% of nitrogen dioxide ($NO_2$) and/or 20% of water can be decomposed to its elements without any difficulty.

Our supported catalyst can be prepared, in principle, by any of the methods proposed in the literature for the manufacture of supported silver-containing catalysts (cf, for example, D. I. Hucknall, *Selective Oxidations of Hydrocarbons*, Academic Press, London (1974), page 6). For example, a suspension of freshly precipitated and well-washed silver oxide (DE-AS 1,211,607) or silver carbonate (U.S. Pat. No. 3,043,854) can be rolled on to a support and the silver compound then thermally decomposed to silver. A preferred method is to impregnate a coarsely porous support with a solution of a silver salt (such as silver nitrate (U.S. Pat. No. 3,575,888) or silver lactate (DE-AS 1,211,607), or a silver complex compound (eg, a silver amine carboxylate complex—DE-OS 2,159,346)) and then to reduce the silver compound to elemental silver by treatment with a reducing agent or by heat treatment.

For information on the preparation of supported catalysts using silver amine complex salts, reference is here made, in particular, to DE-P 4,029,061.1, in which this method is described in detail.

The catalysts preferably used in the process of the invention generally contain from 0.1 to 40% w/w and in particular from 2 to 25% w/w of silver, based on the weight of the catalyst. The size of the silver particles in the unused catalyst is from 0.1 to 200 nm and preferably from 1 to 100 nm and more preferably from 2 to 50 nm. The particle size of the silver can be determined by X-ray diffraction, for example.

The aluminum oxide supports used in the process of the invention have a specific surface area of from 26 to 350 $m^2/g$. (For information on the manufacture of such aluminum oxides cf *Ullmann's Encyclopedia of Industrial Chemistry*, 5th Edition, Vol A1, pp 588–590; VCH, 1985). Preferably, the specific surface area is from 40 to 300 m$^2$/g and more preferably from 50 to 250 m$^2$/g. Measurement of the specific surface area can be carried out using commercially available one-point surface area measuring equipment (Str öhlein "Arcamat 1"). Within the range of such surfaces aluminum oxide can be in the alpha, kappa, beta, delta, theta, and gamma phases. Two or more of these phases may be present in one and the same material. The support used may be of pure aluminum oxide or of a mixture thereof with other oxides. Doping of high-area aluminum oxide supports, ie, the formation of mixed oxides, increases the thermal resistance of the support (cf, eg, DE 3,403,328, DT 2,500,548, *Appl. Catal.* 7, 211–220 (1983), *J. Catal.* 127, 595–604 (1991)). The foreign ions may also contribute to the catalytic activity of the catalyst. In general, the following elements can be used for doping: alkali metals, alkaline earth metals, rare-earth metals, Sc, Ti, V, Cr, Mn, Fe, Co, Ni, Zn, Y, Zr, B, Si, Ge, Sn, Pb, P, Bi. The degree of replacement of the aluminum oxide may be, for example, from 0.01 to 50% w/w. Calcination of the doped support can cause the formation of a spinel.

The porosity of the support is advantageously such that the aluminum oxide support exhibits both mesopores and macropores. The proportion of pores having a diameter between 1 and 100 nm is preferably from 20 to 80% and more preferably from 30 to 70%. Pores having a diameter of from 0.1 to 10 μm and others having a diameter of from 10 to 1000 μm should also be present. The proportion of pores having sizes ranging from 0.1 to 10 μm should be from 0 to 60% and that of pores ranging from 10 to 1000 μm should be from 0 to 30%. Pores in at least one of these size ranges should be present in addition to the pores having a diameter of from 1 to 100 nm. The distribution of the pores in the said two ranges 0.1–10 μm and 10–1000 μm should be narrow in the range of the smaller pores and wider in the range of the larger pores. In general, the amount of pores ranging from 0.1 to 10 μm is greater than that of pores ranging from 10 to 1000 μm. Alternatively, one of these latter types of pore may be absent, which will be no cause for loss of catalytic activity. Thus there can be bimodal or trimodal pore size distributions. The pore volume of the support material(as determined by water intake) is preferably between 35 and 80 ml/g, which corresponds to a value of approximately 30 to 75 ml/g when measured by mercury porosimetry. Suitable supports are commercially available.

In addition to silver, there may be present in the catalyst other active constituents (promoters), particularly Cu, Au, Pd, and Pt, in amounts of up to 40% w/w and preferably of up to 20% w/w, based on the total weight of the active constituents. The supported catalysts of the invention may be in the form of pellets, honeycombs, rings, gravel, solid or hollow extrudates, or units of some other shape (cf, eg, U.S. Pat. No. 2,408,164, GB 2,193,907, U.S. Pat. No. 4,233,187).

In certain applications it is important for the shape and size to be such that minimum pressure losses occur.

In the process of the invention dinitrogen monoxide or a gas mixture containing dinitrogen monoxide is passed over the supported catalyst at an elevated temperature, in particular at from 200° to 1000° C., as a result of which it decomposes to nitrogen and oxygen. The temperature used is preferably from 300° to 900° C. and more preferably from 400° to 850° C. The reactor inlet temperature is from 200° to 700° C. The exothermal decomposition of the N$_2$O can cause the temperature in the catalyst bed to rise. The GHSV (gas hourly space velocity) can be between 500 and 10,000 liters (S.T.P.) of gas per liter of catalyst per hour and is preferably between 1500 and 6000 l/l·h.

The process of the invention will usually be carried out by passing pure dinitrogen monoxide or a gas mixture containing dinitrogen monoxide or an off-gas containing dinitrogen monoxide through a furnace or heat exchanger, for example, to heat it to the required reactor temperature, after which it is passed through a reaction tube packed with the silver catalyst. Alternatively, the preheating stage can take place in the reaction tube itself, which in such case will be provided with a preliminary zone packed with inert material.

The gas mixtures to be treated in the process of the invention may contain, besides N$_2$O, other gases, in particular NO and/or NO$_2$, in a concentration of from 0.01 to 50% v/v, based on the total gas. The NO$_2$ content of the gas mixture is preferably from 0.01 to 50% v/v and more preferably from 0.1 to 30% v/v. In addition to NO$_2$ and NO/NO$_2$ (NO$_x$), other gases, ie, N$_2$, O$_2$, CO, CO$_2$, H$_2$O, and noble gases, may be present in the gas mixtures.

The process is generally carried out under a pressure of from 0.1 to 20 bar; that is to say, it can be operated at subatmospheric and superatmospheric pressures. We prefer to run the process at atmospheric pressure.

The catalyst of the invention and the process of the invention are particularly suitable for decomposing N$_2$O present in the off-gases produced in the synthesis of adipic acid by, say, oxidation of cyclohexanol and/or cyclohexanone with nitric acid.

A special advantage of the process is that the N$_2$O is selectively destroyed, ie, no decomposition of the desirable nitric oxides NO$_x$ takes place.

The process of the invention makes it possible to effect catalytic decomposition of dinitrogen monoxide either as pure gas or in admixture with other gases. The invention constitutes a significant improvement in the art both economically and as regards the productivity of the catalyst.

EXAMPLES

Decomposition of Dinitrogen Monoxide

The experimental setup comprised a steel (Hasteloy C) reaction tube having a length of 80 cm and divided into a preheating zone and a reaction zone. The internal diameter of the tube was 18 mm. For the purpose of measuring the temperature profile along the tube, an inner tube having an external diameter of 3.17 mm was placed inside the reaction tube, into which inner tube it was possible to insert a thermoelement. To increase the heat transfer, the preheating zone of the reactor was packed with inert material (steatite). In each experiment, 40 ml of catalyst (gravel 1.5–2 mm) were used at atmospheric pressure.

Typically, the gas composition was as follows:
N$_2$O: 23% v/v
NO+NO$_2$: 17% v/v
N$_2$: 47% v/v
O$_2$: 7.5% v/v
H$_2$O: 3% v/v
CO$_2$: 2.5% v/v
GHSV: 4000 liters (S.T.P.) of gas per liter of catalyst per hour.

The N₂O conversions were calculated using the following equation:

$$\% \text{ Conversion} = \frac{\text{N}_2\text{O concentration at inlet} - \text{N}_2\text{O concentration at outlet}}{\text{N}_2\text{O concentration at outlet}} \times 100$$

The N₂O concentration was determined by gas-chromatographic analysis.

EXAMPLE 1

Preparation of Catalyst 80 g of commercial aluminum oxide support material (BASF D 10-11) (specific surface area 210 m$^2$/g; water intake 65.9% w/w, indicating a pore volume of 65.9 m$^2$/g; pore distribution as shown in FIG. 1) were impregnated with 56 ml of an aqueous solution containing 22.24 g of AgNO$_3$ and then allowed to stand for one hour at room temperature. The impregnated support was dried at 120° C. to constant weight and, finally, calcined for 4 hours at 700° C. The resulting catalyst contained 14.2% w/w of silver and had a specific surface area of 163 m$^2$/g. The crystallographic phase of the support was gamma-aluminum oxide. The silver particle size was 27 nm.

The catalyst produced N$_2$O conversions of more than 99% over an on-stream period of 550 h at a reactor inlet temperature of 550° C.

At the end of the experiment, the catalyst had a specific surface area of 130 m$^2$/g. The only crystallographic phase of the support was still gamma-aluminum oxide at the end of the test, and the silver particle size was then 32 nm.

EXAMPLE 2

Figure 2:
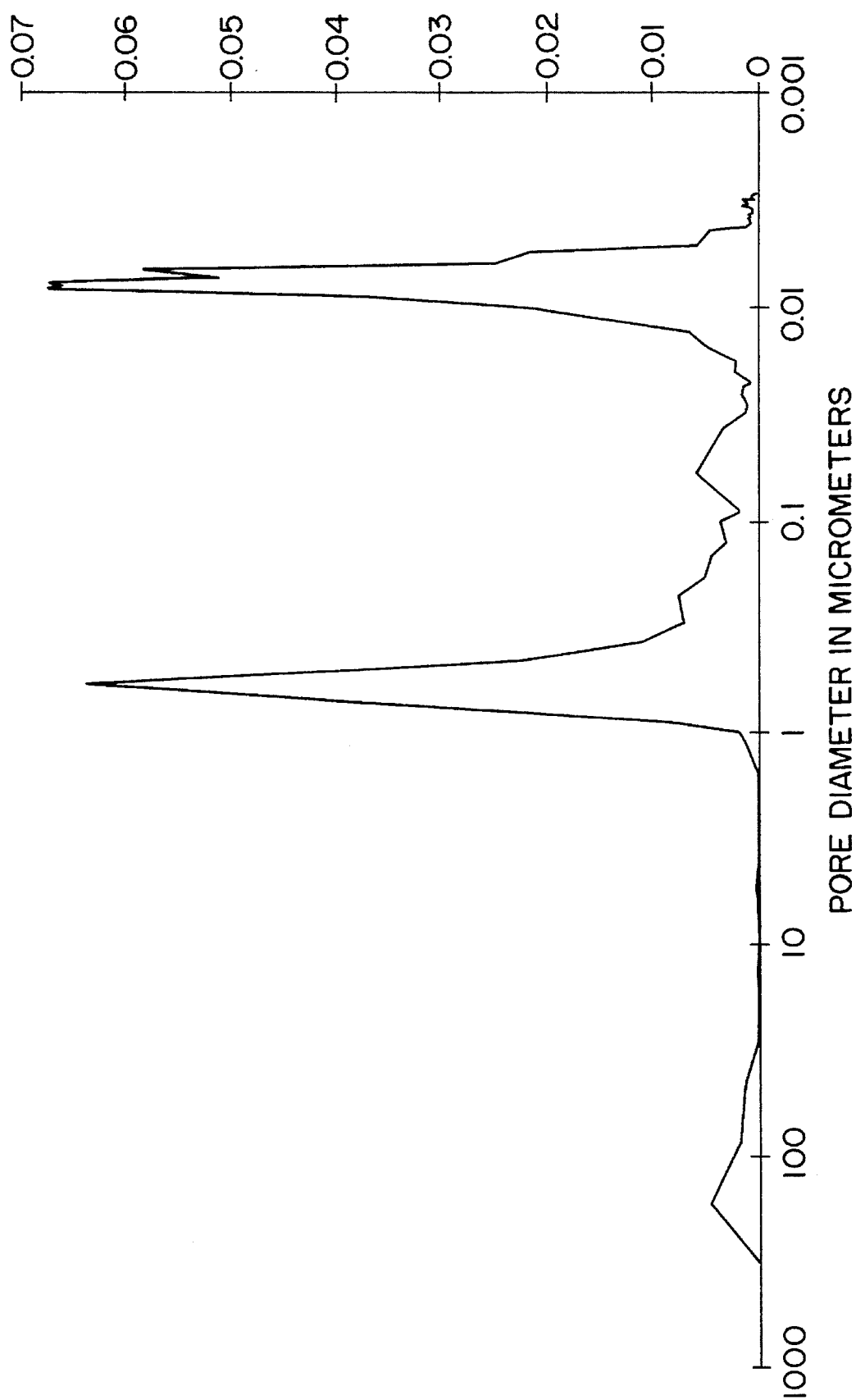

Preparation of Catalyst 126.75 g of commercial aluminum oxide support material (specific surface area 157 m$^2$/g; water intake 61.3% w/w; pore distribution as in FIG. 2) were impregnated with 94 ml of an aqueous solution containing 35.22 g of AgNO$_3$, after which it was allowed to stand for one hour at room temperature. The impregnated support was dried at 120° C. to constant weight and, finally, calcined for 4 hours at 700° C. The resulting catalyst contained 14.2% w/w of silver and had a specific surface area of 128 m$^2$/g. The crystallographic phase of the support was gamma-aluminum oxide.

The catalyst produced N$_2$O conversions of more than 99% over an on-stream period of 280 h at a reactor inlet temperature of 532° C.

At the end of the experiment, the catalyst had a specific surface area of 109 m$^2$/g. The crystallographic phase of the support was still gamma-aluminum oxide.

EXAMPLE 3

Preparation of Catalyst 160.95 g of commercial aluminum oxide support material (specific surface area 102 m$^2$/g, water intake 38.7% w/w) were impregnated with 62.3 ml of an aqueous solution containing 44.71 g of AgNO$_3$ and then left to stand for one hour at room temperature. The impregnated support was dried at 120° C. to constant weight and then calcined for 4 hours at 700° C. The resulting catalyst contained 14.5% w/w of silver and had a specific surface area of 82 m$^2$/g. The crystallographic phase of the support was delta-aluminum oxide.

The catalyst-produced N$_2$O conversions of more than 99% over an on-stream period of 250 h at a reactor inlet temperature of 529° C.

At the end of the experiment, the catalyst had a specific surface area of 77 m$^2$/g. The crystallographic phase of the support was still delta-aluminum oxide.

EXAMPLE 4

Preparation of Catalyst 225 g of AlO(OH) (Condea Pural SB) were kneaded with 25 g of Ce$_2$(CO$_3$)$_3$ and 12.5 g of formic acid for 5 hours and then extruded, dried, and calcined. 45.36 g thereof specific surface area 185 m$^2$/g; water intake 76% w/w) were impregnated with 36.7 ml of an aqueous solution containing 13.43 g of AgNO$_3$ and then allowed to stand for one hour at room temperature. The impregnated support was dried at 120° C. to constant weight and, finally, calcined for 4 hours at 700° C. in order to reduce the AgNO$_3$ to Ag. The resulting catalyst contained 14.3% w/w of silver and had a specific surface area of 157 m$^2$/g.

The catalyst produced N$_2$O conversions of more than 99% over an on-stream period of 350 h at a reactor temperature of 524° C.

At the end of the experiment, the catalyst had a specific surface area of 139 m$^2$/g.

EXAMPLE 5

Preparation of Catalyst 225 g of AlO(OH) (as in Example 4) were kneaded with 25 g of La(NO$_3$)$_3$ and 12.5 g of formic acid for 3 hours and then extruded, dried, and calcined. 64.10 g thereof (specific surface area 183 m$^2$/g; water intake 76% w/w) were impregnated with 50.9 ml of an aqueous solution containing 17.8 g of AgNO$_3$ and then allowed to stand for one hour at room temperature. The impregnated support was dried at 120° C. to constant weight and, finally, calcined for 4 hours at 700° C. The resulting catalyst contained 14.5% w/w of silver and had a specific surface area of 156 m$^2$/g.

The catalyst produced N$_2$O conversions of more than 99% over an on-stream period of 280 h at a reactor temperature of 530° C.

At the end of the experiment, the catalyst had a specific surface area of 136 m$^2$/g.

COMPARATIVE EXAMPLE 1

Preparation of Catalyst 150 g of commercial aluminum oxide support material (specific surface area 1.7 m$^2$/g; water intake 29.2% w) were impregnated with 100 ml of an aqueous solution containing 41.7 g of AgNO$_3$ and then allowed to stand for one hour at room temperature. The impregnated support was dried to constant weight at 120° C. and then calcined for 4 hours at 700° C. The resulting catalyst contained 14.6% w/w of silver and had a specific surface area of 1.12 m$^2$/g. The crystallographic phase of the support was alpha-aluminum oxide.

The catalyst produced N$_2$O conversions of 97.5% over an initial on-stream period of 150 h at a reactor temperature of 610° C. The conversion rate then dropped to 86.5% in spite of a temperature increase to 630° C.

COMPARATIVE EXAMPLE 2

Preparation of Catalyst

A palladium-on-alpha-aluminum oxide catalyst was prepared as specified in, eg, DE-OS 3,543,640. 200 g of alpha-aluminum oxide (specific surface area 20.2 m$^2$/g) were impregnated with NaOH and dried at 120° C. This support was impregnated with 96 ml of an aqueous sodium tetrachloropalladate(II) solution containing 1.29 g of Pd and then left to stand for 3 hours at room temperature. This support containing Pd$^{2+}$ was then treated with hydrazine to reduce the Pd$^{2+}$. The catalyst was then washed until free from chlorine and dried to constant weight at 120° C. The catalyst thus formed contained 0.64% w/w of palladium.

Over an initial on-stream period of 112 h, the catalyst produced N$_2$O conversions of 43.3% at a reactor temperature of 600° C. By raising the temperature to 640° C. it was then possible to increase the conversion rate to 66.5%.

We claim:

1. A process for the decomposition of dinitrogen monoxide which comprises: passing the dinitrogen monoxide at a temperature of from 200° to 1000° C. over a silver-containing catalyst supported on an aluminum oxide material having a specific surface area of from about 40 to 300 m$^2$/g, wherein the dinitrogen monoxide decomposes to form the elements nitrogen and oxygen.

2. A process as defined in claim 1, wherein the aluminum oxide support is in a crystallographically pure phase or is a mixture of crystallographic phases.

3. A process as defined in claim 1, wherein the aluminum oxide support contains mesopores and macropores.

4. A process as defined in claim 3, wherein the distribution of pore sizes is bimodal or trimodal.

5. A process as defined in claim 1, wherein the aluminum oxide support consists of pure aluminum oxide or a mixture of aluminum oxide with another oxide of oxides.

6. A process as defined in claim 5, wherein the oxide(s) other than aluminum oxide are present in a concentration of from 0.01 to 50% w/w, based on the weight of the support, and are selected from the group consisting of alkali metals, alkaline earth metals, rare-earth metals, Sc, Ti, V, Cr, Mn, Fe, Co, Ni, Zn, Y, Zr, B, Ge, Sn, Pg, P, Bi and Si.

7. A process catalyst as defined in claim 5, wherein a mixture of aluminum oxide and another oxide or oxides has been calcined to form a spinel.

8. A process as defined in claim 1, wherein the support carries, in addition to silver, one or more elements selected from the group consisting of Cu, Au, Pd, and Pt.

9. A process as defined in claim 1, wherein the amount of said additional elements on the support is from 0.1 to 40% w/w, based on the total weight of the catalyst.

10. A process as defined in claim 1, wherein the decomposition is carried out in the presence of from 0.01 to 50% v/v of either NO or NO$_2$, or 0.01 to 50% v/v of a mixture of NO and NO$_2$ based on the total volume of gas.

11. A process as defined in claim 10, wherein the gas mixture contains, in addition to N$_2$O and NO, at least one other gas from the group consisting of N$_2$, O$_2$, CO, CO$_2$, H$_2$O and noble gases.

12. A process as defined in claim 1, wherein the gas is a mixture containing from 0.01 to 50% v/v of NO$_2$.

13. A process as defined in claim 1, wherein the gas mixture to be treated is an off-gas from the synthesis of adipic acid using nitric acid.

14. A process as defined in claim 1, wherein the decomposition is carried out at a temperature of from 400° to 850° C. and wherein the aluminum oxide material has a specific surface area of from about 50 to 250 m$^2$/g.

* * * * *

UNITED STATES PATENT AND TRADEMARK OFFICE
CERTIFICATE OF CORRECTION

PATENT NO.: 5,612,009

DATED: March 18, 1997

INVENTOR(S): FETZER et al.

It is certified that error appears in the above-identified patent and that said Letters Patent is hereby corrected as shown below:

Column 8, claim 5, line 2, "of" should be --or--.

Column 8, claim 6, line 8, "Pg" should be --Pb--.

Signed and Sealed this

Twenty-seventh Day of May, 1997

Attest:

BRUCE LEHMAN

Attesting Officer

Commissioner of Patents and Trademarks